(12) United States Patent
Ballentine et al.

(10) Patent No.: US 11,188,539 B2
(45) Date of Patent: Nov. 30, 2021

(54) MATCHING NON-SEQUENTIAL LOG METADATA WITH OUT-OF-ORDER RECORD DATA

(71) Applicant: International Business Machines Corporation, Armonk, NY (US)

(72) Inventors: Scott Ballentine, Poughkeepsie, NY (US); Anthony T. Sofia, Hopewell-Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 209 days.

(21) Appl. No.: 16/047,497

(22) Filed: Jul. 27, 2018

(65) Prior Publication Data

US 2020/0034466 A1    Jan. 30, 2020

(51) Int. Cl.
*G06F 15/16* (2006.01)
*G06F 16/2455* (2019.01)

(52) U.S. Cl.
CPC .............. *G06F 16/24558* (2019.01)

(58) Field of Classification Search
CPC ....... A61K 31/485; A61K 47/60; A61P 43/00; A61P 25/36; A61P 25/04; A61P 47/30
See application file for complete search history.

(56) References Cited

U.S. PATENT DOCUMENTS

| | | | | |
|---|---|---|---|---|
| 8,364,682 B1 * | 1/2013 | Gershony | .............. | G06Q 30/02 707/739 |
| 8,818,951 B1 * | 8/2014 | Muntz | ................. | G06F 11/1458 707/639 |
| 9,596,207 B1 * | 3/2017 | Lin | .......................... | H04L 51/32 |
| 2006/0020634 A1 * | 1/2006 | Huras | ................. | G06F 16/2358 |
| 2007/0283194 A1 * | 12/2007 | Villella | ............... | G06F 11/3476 714/57 |
| 2010/0211826 A1 * | 8/2010 | Villella | ............... | G06F 11/3476 714/39 |

(Continued)

OTHER PUBLICATIONS

Disperse metadata independently of object data. IBM Cloud Object Storage System 3.12.0 Documentation. Dec. 2017. pp. 1-5. (Year: 2017).*

(Continued)

*Primary Examiner* — Alex Gofman
*Assistant Examiner* — Shelly X Qian
(74) *Attorney, Agent, or Firm* — Cantor Colburn LLP; Teddi Maranzano (57) ABSTRACT

According to aspects of the present disclosure, a computer-implemented method includes generating a metadata record for each event record of a subset of a plurality of event records, the metadata record being one of a plurality of metadata records. The method further includes assigning a metadata indicator to each event record of the subset of the plurality of event records to indicate that the event record is associated with a metadata record. The method further includes assigning, for each event record of the subset of the plurality of event records and the metadata record associated therewith, a timestamp. The method further includes matching for each event record of the subset of the plurality of event records, one of the plurality of metadata records with the event record based at least in part on the metadata indicator and the timestamp.

8 Claims, 6 Drawing Sheets

(56) References Cited

U.S. PATENT DOCUMENTS

| | | |
|---|---|---|
| 2016/0012100 A1 | 1/2016 | Anderson |
| 2016/0019247 A1 | 1/2016 | Gensler, Jr. et al. |
| 2016/0188690 A1 | 6/2016 | Tan et al. |
| 2018/0081763 A1* | 3/2018 | Christie ............... G06Q 10/06 |
| 2018/0121362 A1 | 5/2018 | Garg et al. |

OTHER PUBLICATIONS

Sorted/Ordered Linear Search, www.studyalgorithms.com, pp. 1-2. Jan. 2014. (Year: 2014).* https://www.tutorialspoint.com/sql/index.htm, 2018, pp. 1-7. (Year: 2018).*

Round, floor and ceiling methods for date-time objects, https://lubridate.tidyverse.org/reference/round_date.html, Jan. 26, 2018, pp. 1-5. (Year: 2018).*

* cited by examiner

MATCHING NON-SEQUENTIAL LOG METADATA WITH OUT-OF-ORDER RECORD DATA

BACKGROUND

The present invention generally relates to computer processing systems, and more specifically, to matching non-sequential log metadata with out-of-order record data. Many processing systems log events by generating event records and storing the event records. Some of these processing systems additionally build metadata to augment these records with additional information, such as timestamps.

SUMMARY

Embodiments of the present invention are directed to a computer-implemented method for matching metadata records to event records. A non-limiting example of the computer-implemented method includes generating, by a processing device, a metadata record for each event record of a subset of a plurality of event records, the metadata record being one of a plurality of metadata records. The method further includes assigning, by the processing device, a metadata indicator to each event record of the subset of the plurality of event records to indicate that the event record is associated with a metadata record. The method further includes assigning, by the processing device, for each event record of the subset of the plurality of event records and the metadata record associated therewith, a timestamp. The method further includes matching, by the processing device, for each event record of the subset of the plurality of event records, one of the plurality of metadata records with the event record based at least in part on the metadata indicator and the timestamp.

Embodiments of the present invention are directed to a system. A non-limiting example of the system includes a memory comprising computer readable instructions and a processing device for executing the computer readable instructions for performing the method for matching metadata records to event records.

Embodiments of the invention are directed to a computer program product. A non-limiting example of the computer program product includes a computer readable storage medium having program instructions embodied therewith. The program instructions are executable by a processor to cause the processor to perform the method for matching metadata records to event records.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
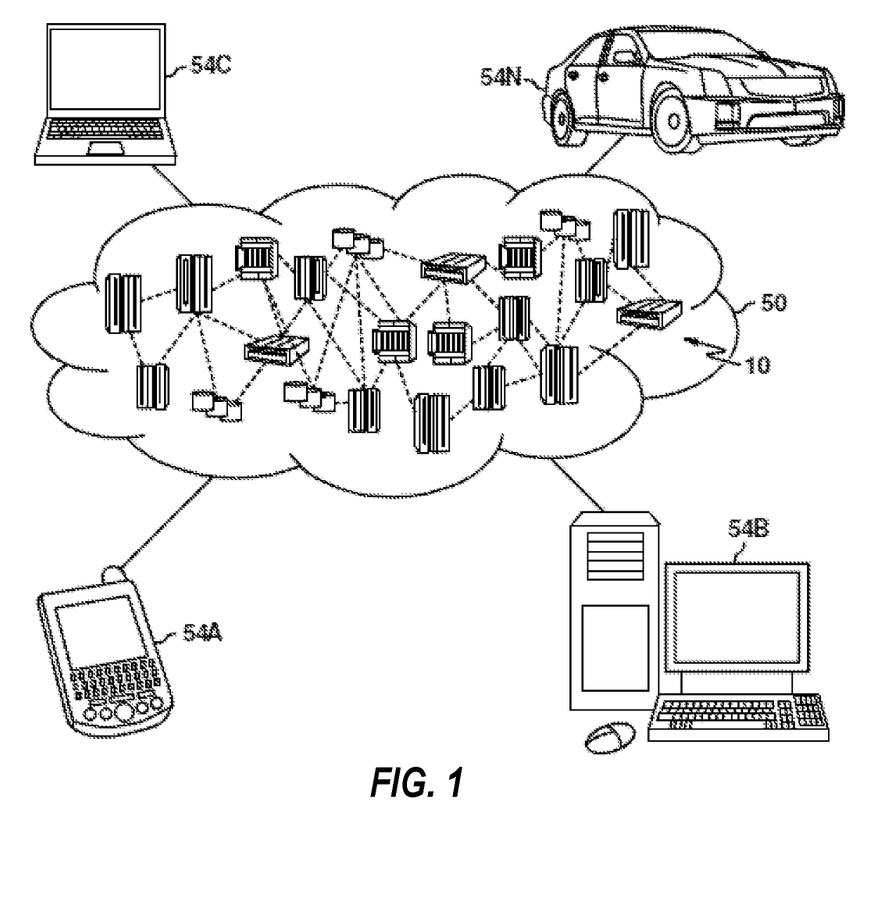
FIG. 1 depicts a cloud computing environment according to one or more embodiments described herein.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
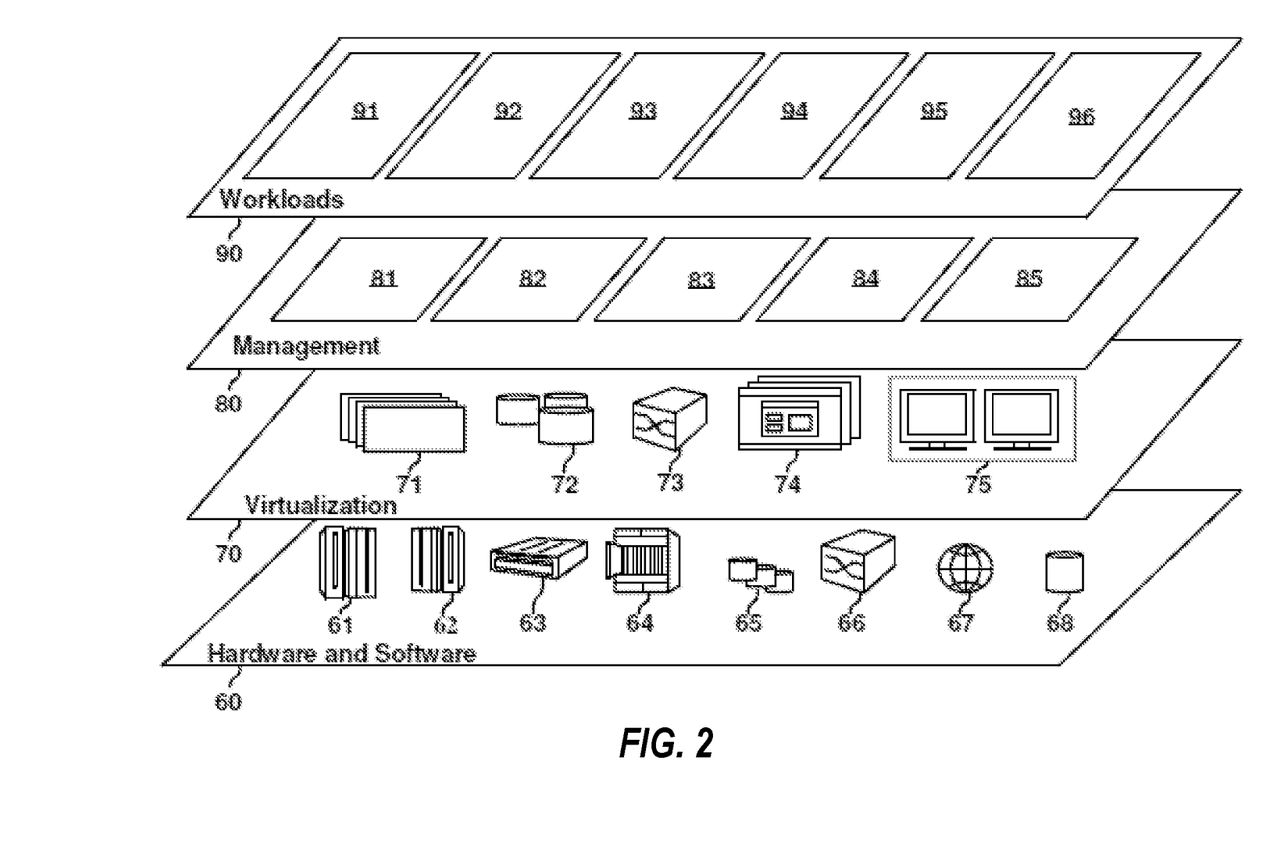
FIG. 2 depicts abstraction model layers according to one or more embodiments described herein.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and record/event logging 96.

Figure 3:
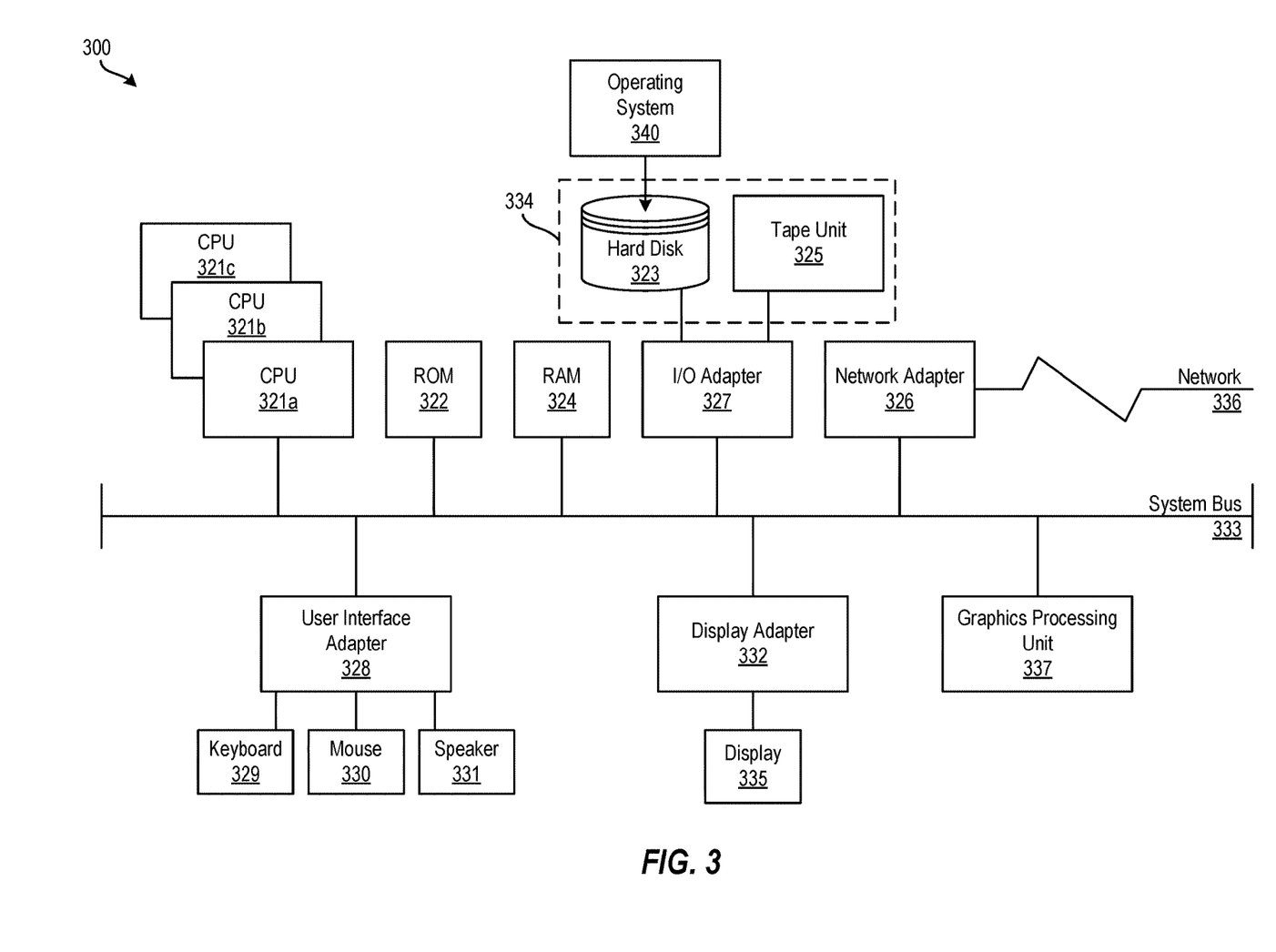
FIG. 3 depicts a block diagram of a processing system for implementing the techniques described according to one or more embodiments described herein.

It is understood that the present disclosure is capable of being implemented in conjunction with any other type of computing environment now known or later developed. For example, FIG. 3 depicts a block diagram of a processing system 300 for implementing the techniques described herein. In examples, processing system 300 has one or more central processing units (processors) 321a, 321b, 321c, etc. (collectively or generically referred to as processor(s) 321 and/or as processing device(s)). In aspects of the present disclosure, each processor 321 can include a reduced instruction set computer (RISC) microprocessor. Processors 321 are coupled to system memory (e.g., random access memory (RAM) 324) and various other components via a system bus 333. Read only memory (ROM) 322 is coupled to system bus 333 and may include a basic input/output system (BIOS), which controls certain basic functions of processing system 300.

Further depicted are an input/output (I/O) adapter 327 and a network adapter 326 coupled to system bus 333. I/O adapter 327 may be a small computer system interface (SCSI) adapter that communicates with a hard disk 323 and/or a tape storage drive 325 or any other similar component. I/O adapter 327, hard disk 323, and tape storage device 325 are collectively referred to herein as mass storage 334. Operating system 340 for execution on processing system 300 may be stored in mass storage 334. The network adapter 326 interconnects system bus 333 with an outside network 336 enabling processing system 300 to communicate with other such systems.

A display (e.g., a display monitor) 335 is connected to system bus 333 by display adaptor 332, which may include a graphics adapter to improve the performance of graphics intensive applications and a video controller. In one aspect of the present disclosure, adapters 326, 327, and/or 232 may be connected to one or more I/O busses that are connected to system bus 333 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 333 via user interface adapter 328 and display adapter 332. A keyboard 329, mouse 330, and speaker 331 may be interconnected to system bus 333 via user interface adapter 328, which may include, for example, a Super I/O chip integrating multiple device adapters into a single integrated circuit.

In some aspects of the present disclosure, processing system 300 includes a graphics processing unit 337. Graphics processing unit 337 is a specialized electronic circuit designed to manipulate and alter memory to accelerate the creation of images in a frame buffer intended for output to a display. In general, graphics processing unit 337 is very efficient at manipulating computer graphics and image processing, and has a highly parallel structure that makes it more effective than general-purpose CPUs for algorithms where processing of large blocks of data is done in parallel.

Thus, as configured herein, processing system 300 includes processing capability in the form of processors 321, storage capability including system memory (e.g., RAM 324), and mass storage 334, input means such as keyboard 329 and mouse 330, and output capability including speaker 331 and display 335. In some aspects of the present disclosure, a portion of system memory (e.g., RAM 324) and mass storage 334 collectively store an operating system such as the AIX® operating system from IBM Corporation to coordinate the functions of the various components shown in processing system 300.

Turning now to an overview of technologies that are more specifically relevant to aspects of the invention, techniques are described herein that relate to matching non-sequential log metadata with out-of-order event records. There are cases where a logging system, which accepts records, builds metadata to augment those records with additional information. When a processing system receives a record of an event, the processing system may generate metadata about the event. For example, the metadata can be generated to indicate that the record crosses a time boundary (such as crossing a minute boundary). Consider the following example: If a first event occurs at 12:01:59 and a second event occurs at 12:02:01, then the first event is said to have crossed a minute time boundary (i.e., the first event crossed the boundary between 12:01 and 12:02). Metadata is generated for the first event that indicates that the first event crossed the minute boundary. In this example, time is described in the form HH:MM:SS, where HH is hours, MM is minutes, and SS is seconds.

When the metadata is generated, it may not be initially stored along with the event with which the metadata is associated. For example, the metadata is built and stored in a different location than the event record. The metadata is not blocked with the event record. In essence, two groups of data are stored separately: the event record and the metadata. At a later point in processing, the event record and the metadata are brought back together with the intent of merging the two groups of records into a single set of data records ordered by time, such that the metadata records are stored with their associated event records. However, this presents a technical problem of rejoining or matching the metadata with the associated event record because not all events have metadata associated therewith. Accordingly, the metadata is out-of-order compared to the event records.

The present techniques provide a technological solution to solve this technical problem by matching non-sequential log metadata with out-of-order event records. In particular, two different technological solutions are described, which can be implemented independently or together in combination. One such technological solution uses timestamp information between an event record and metadata to match the event record and the metadata in conjunction with a metadata indicator that signifies that the event record has a corresponding metadata record. The other technological solution uses a count of event records since the last metadata record was generated to match the event record and the metadata. These different matching solutions can be used together to validate the results of the matching between the event record and the metadata.

The timestamp matching approach matches records exactly, and the counter matching approach can provide a cross-checking mechanism to ensure that the correct number of records have been processed before the metadata indicator has been set. In an environment where the entire set of records is not available, then the timestamp matching approach is able to determine that metadata is available for a particular event record. The counter matching approach relies on having a prior event record and prior metadata record that are known to match, so this approach is particularly useful in an environment where the entire set of records is available or where additional mechanisms such as the timestamp matching approach are also used.

It should be appreciated that the technological solutions described herein represent improvements to computer functionality. For example, the matching techniques described herein provide for the efficient generation of metadata by enabling metadata to be:generated when an event record is received, stored separately from the event record, and later matched back up with the event record. This enables processing systems to quickly and efficiently receive and store event records and is more efficient and timely than storing the metadata records with the event records at the time that the event records are received. Accordingly, fewer processing resources are consumed and less time is needed to store the event records and metadata records, thereby improving computer functionality.

Figure 4:
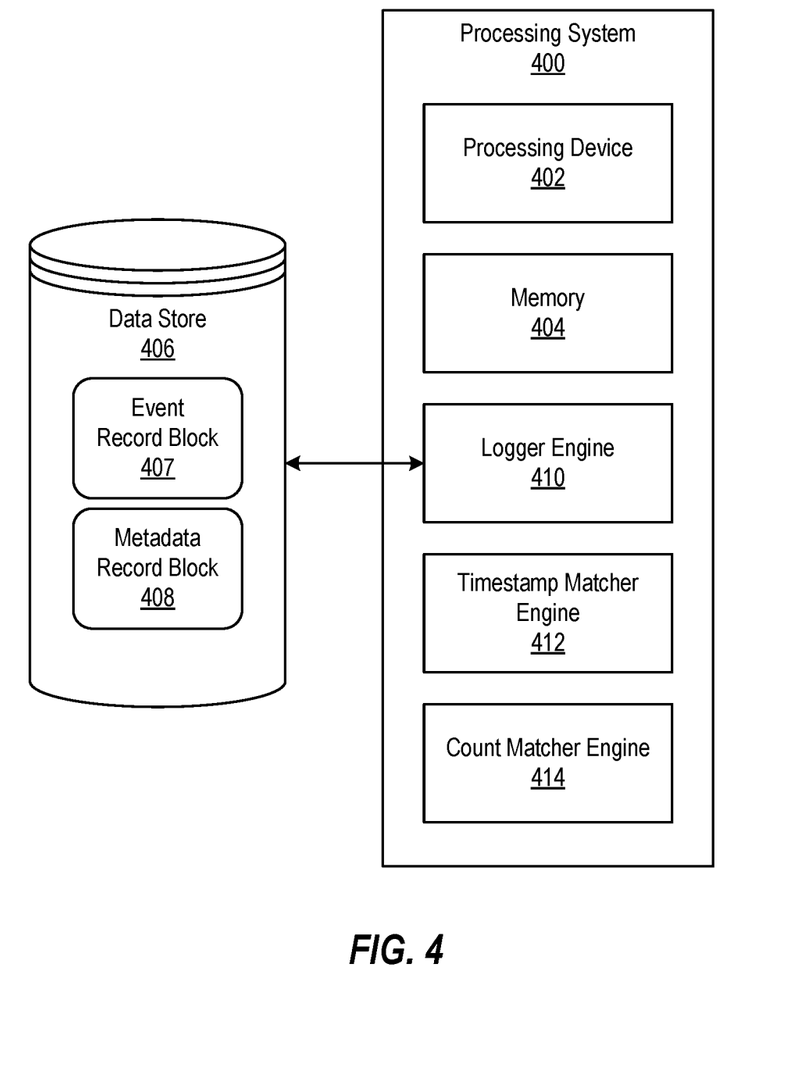
FIG. 4 depicts a block diagram of a processing system for matching non-sequential log metadata with out-of-order event records according to one or more embodiments described herein.

Turning now to a more detailed description of aspects of the present invention, FIG. 4 depicts a block diagram of a processing system 400 for matching non-sequential log metadata with out-of-order event records according to one or more embodiments described herein. The processing system 400 includes a processing device 402, a memory 404, a data store 406, a logger engine 410, a timestamp matcher engine 412, and a count matcher engine 414.

When event records are created and/or received by the processing system 400, the logger engine 410 receives the event records and generates metadata for the event records as appropriate. For example, metadata is generated for some event records (e.g., events that cross a time boundary), while metadata is not generated for other event records. The logger engine 410 stores the event records into the data store 406 in an event record block 407, and the logger engine 410 separately stores a metadata record (containing the metadata) into the data store 406 in a metadata record block 408. In this example, the event records are packed together and recorded in the event record block 407 of the data store 406 and the metadata records are separately packed together and added to the data store 406 at the end of the event record block 407. Accordingly, the event records and the metadata records are stored separately. It is useful to later rejoin the metadata records with their associated event records by using matching techniques, such as the matching techniques described herein.

One example of a matching technique is performed by the timestamp matcher engine 412, which uses a metadata indicator and a timestamp to match metadata records and event records. When a metadata record is built for an event record, the timestamp matcher engine 412 marks the event record with a metadata indicator that it has corresponding metadata. When matching the metadata record to the event record, only the event records with the metadata indicator as well as a timestamp that matches a metadata record stored in the metadata record block 408 are considered a match. This allows multiple event records to share a timestamp value, but only one will contain the metadata indicator that it matches a metadata record.

Another example of a matching technique is performed by the count matcher engine 414. The metadata record can also include a count of event records since the last metadata record was generated. When matching the metadata records with the event records, the application can track the count of event records as they are read. When a new metadata record is found, the count in the metadata record is compared with the count of event records. If the count in the metadata record is greater than the count in the event record (i.e., not enough event records read), the count matcher engine 414 can simply continue reading event records as needed until the counts match, at which time the metadata record is considered a match. If the count in the metadata record is less than the count in the event record (i.e., too many event records have been read), the count matcher engine 414 can either "back up" the appropriate number of event records to correlate the metadata and event records or can restart at the prior metadata record and read forward the appropriate number of event records.

The various components, modules, engines, etc. described regarding FIG. 4 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 402 for executing those instructions. Thus a system memory (e.g., memory 404) can store program instructions that when executed by the processing device 402 implement the engines described herein. Other engines can also be utilized to include other features and functionality described in other examples herein.

Figure 5:
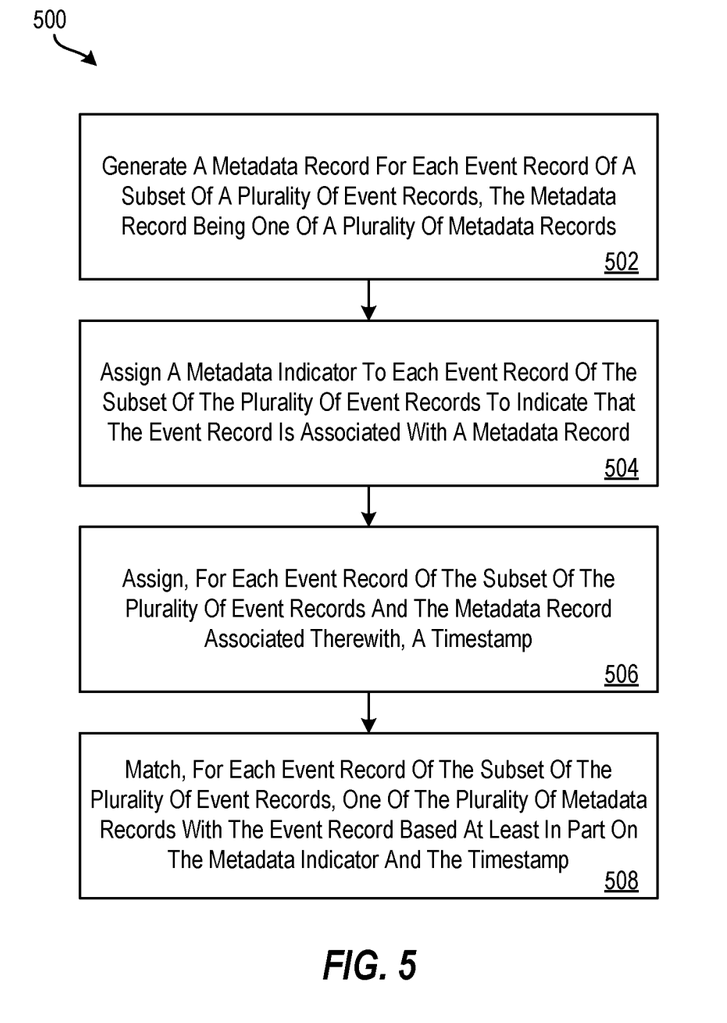
FIG. 5 depicts a flow diagram of a method for performing a timestamp matching technique to match metadata to event records according to one or more embodiments described herein.

FIG. 5 depicts a flow diagram of a method 500 for performing a timestamp matching technique to match metadata to event records according to one or more embodiments described herein. The method 500 can be implemented using any suitable processing system and/or processing device, such as the processing system 300 of FIG. 3, the processing system 400 of FIG. 4, the processing device 402 of FIG. 4, and the like.

At block 502, the logger engine 410 generates (or receives) a metadata record for each event record of a subset of a plurality of event records, the metadata record being one of a plurality of metadata records. The event records and the metadata records are stored in the data store 406 in separate blocks. For example, the event records are stored in event record block 407 and the metadata records are stored in the metadata record block 408, which is separate from the event record block 407. In one example, the metadata record block 408 is at the end of the event record block 407.

At block 504, the logger engine 410 assigns a metadata indicator to each event record of the subset of the plurality of event records to indicate that the event record is associated with a metadata record. This marks each event record that has an associated metadata record with an indication that the metadata record exists.

At block 506, the logger engine 410 assigns, for each event record of the subset of the plurality of event records and the metadata record associated therewith, a timestamp. The timestamps for an event record and its associated metadata record are the same. For example, the timestamp is the time that the event record is received. In another example, the timestamp is the time that the metadata record is generated, which matches the time from the event record.

At block 508, the timestamp matcher engine 412 performs a timestamp matching by matching, for each event record of the subset of the plurality of event records, one of the plurality of metadata records with the event record based at least in part on the metadata indicator and the timestamp. According to one or more embodiments described herein, the matching includes the timestamp matcher engine 412 determining whether an event record has a metadata indicator assigned thereto and, if so, comparing the timestamp of the plurality of metadata records to the timestamp of the event record that has a metadata indicator assigned thereto.

According to one or more embodiments described herein, the matching further includes the timestamp matcher engine 412 determining that a metadata record matches an event record when the event record has a metadata indicator assigned thereto and when the metadata record and the event record have timestamps that are the same. That is, if an event record has a metadata indicator set, the metadata that matches the event record is the metadata with a timestamp that matches a timestamp of the event record.

Additional processes also may be included, and it should be understood that the process depicted in FIG. 5 represents an illustration, and that other processes may be added or existing processes may be removed, modified, or rearranged without departing from the scope and spirit of the present disclosure.

Figure 6:
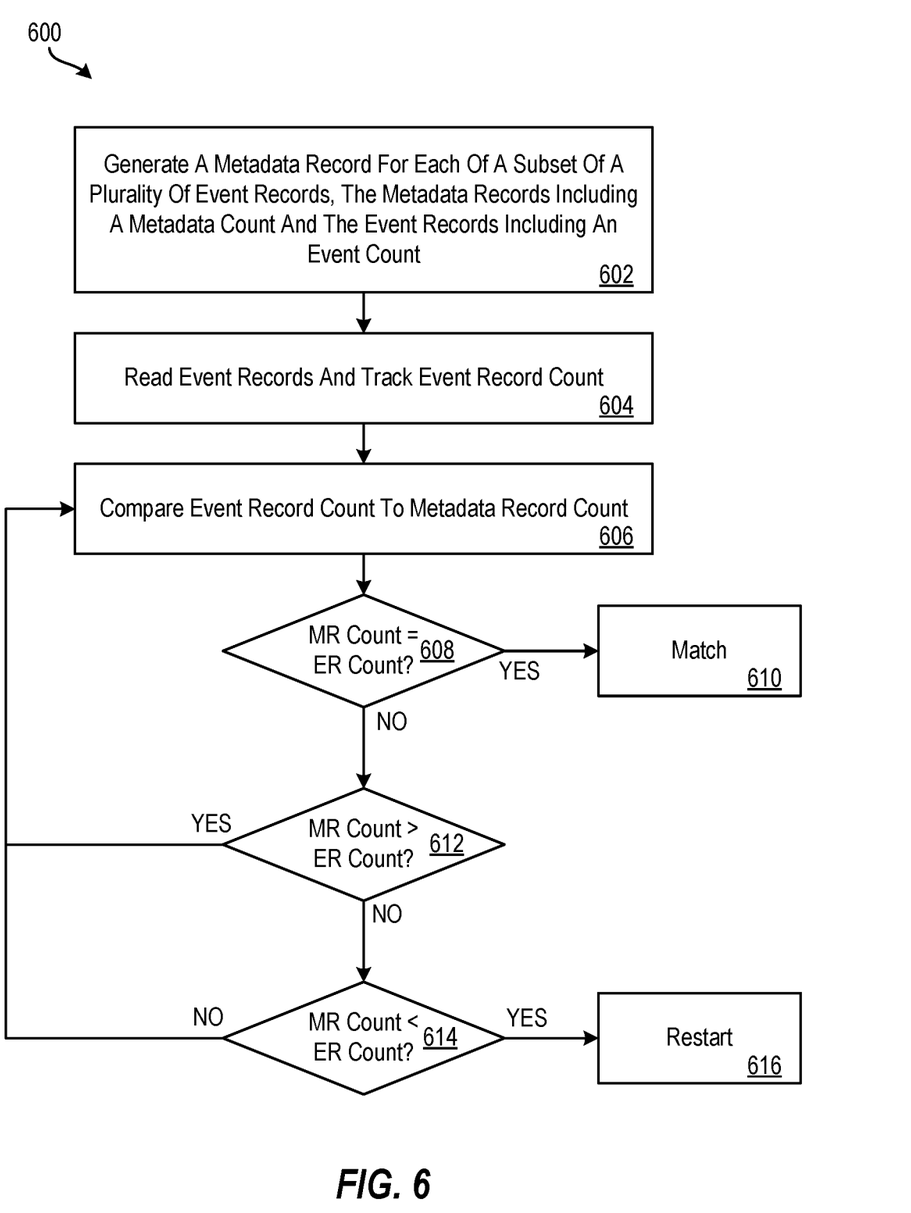
FIG. 6 depicts a flow diagram of a method for performing a count matching technique to match metadata to event records according to one or more embodiments described herein.

According to one or more embodiments described herein, the timestamp matching technique of the method 500 can be verified using a count matching technique. In particular, FIG. 6 depicts a flow diagram of a method 600 for performing a count matching technique to match metadata to event records according to one or more embodiments described herein. The method 600 can be implemented using any suitable processing system and/or processing devices, such as the processing system 300 of FIG. 3, the processing system 400 of FIG. 4, the processing device 402 of FIG. 4, and the like.

At block 602, the logger engine 410 generates (or receives) a metadata record for each of a subset of a plurality of event records, the metadata record being one of a plurality of metadata records. In this example, a metadata record includes a count of the event records since the last metadata record was issued. For example, if ten event records are received, and metadata records exist for the first, fourth, and tenth event records, the count for the first metadata record is zero, the count for the fourth metadata record is three, and the count for the tenth metadata record is six.

At block 604, the count matcher engine 414 begins matching the metadata records to the event records by reading event records and tracking a count of the event records as they are read. At block 606, the count matcher engine 414 compares the count of the event records (referred to as the "event record count") to a count of the metadata records (referred to as the "metadata record count").

At decision block 608, the count matcher engine 414 determines whether the metadata record count is equal to the event record count. If so, a match exists at block 610. If not, method 600 continues to decision block 612, and the count matcher engine 414 then determines, at decision block 612, whether the metadata record count is greater than the event record count. If so, the count matcher engine 414 returns to block 606 and continues to compare the event record count to the metadata record count. If not, the count matcher engine 414 then determines, at decision block 614, whether the metadata record count is less than the event record count. If so, this indicates that too many event records have been read at block 604 and the method 600 can either "back up" an appropriate number of event records to correlate the event records and metadata records, or the method 600 can restart, at block 616, the prior metadata record and read forward the appropriate number of event records. If, at decision block 614, it is determined that the metadata record count is not less than the event record count, the method 600 returns to block 606.

Additional processes also may be included, and it should be understood that the process depicted in FIG. 6 represents an illustration and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for matching metadata records to event records, the method comprising:
   generating, by a processing device, a metadata record for each event record of a subset of a plurality of event records, the metadata record being one of a plurality of metadata records,
wherein each of the subset of the plurality of event records is associated with a corresponding event that crosses a time boundary, while metadata records are not generated for event records other than the subset of the plurality of event records;
    storing, by the processing device, the event records in a first block and the metadata records at an end of the first block;
    assigning, by the processing device, a metadata indicator to each event record of the subset of the plurality of event records to indicate that the event record is associated with a metadata record;
    assigning, by the processing device, for each event record of the subset of the plurality of event records and the metadata record associated therewith, a timestamp;
    matching, by the processing device, for each event record of the subset of the plurality of event records, one of the plurality of metadata records with the event record based at least in part on the metadata indicator and the timestamp; and
    verifying the matching by performing a count matching technique comprising:
        comparing a metadata record count to an event record count; and
        responsive to determining that the metadata record count is greater than the event record count, continuing comparing the event record count to the metadata count record until the metadata record count is equal to the event record count,
    wherein the matching further comprises:
        determining, by the processing device, that a metadata record matches an event record when the event record has a metadata indicator assigned thereto and when the metadata record and the event record have timestamps that are the same.

2. The computer-implemented method of claim 1, wherein the matching comprises:
    determining, by the processing device, that an event record has a metadata indicator assigned thereto; and
    comparing, by the processing device, the timestamp of the metadata records to the timestamp of the event record that has the metadata indicator assigned thereto.

3. The computer-implemented method of claim 1, further comprising determining, by the processing device, that a metadata record matches an event record when the metadata record count matches the event record count.

4. A system comprising:
    a memory comprising computer readable instructions; and
    a processing device for executing the computer readable instructions for performing a method for matching metadata records to event records, the method comprising:
        generating, by the processing device, a metadata record for each event record of a subset of a plurality of event records, the metadata record being one of a plurality of metadata records, wherein each of the subset of the plurality of event records is associated with a corresponding event that crosses a time boundary, while metadata records are not generated for event records other than the subset of the plurality of event records;
        storing, by the processing device, the event records in a first block and the metadata records at an end of the first block;
        assigning, by the processing device, a metadata indicator to each event record of the subset of the plurality of event records to indicate that the event record is associated with a metadata record;
        assigning, by the processing device, for each event record of the subset of the plurality of event records and the metadata record associated therewith, a timestamp;
        matching, by the processing device, for each event record of the subset of the plurality of event records, one of the plurality of metadata records with the event record based at least in part on the metadata indicator and the timestamp; and
        verifying the matching by performing a count matching technique comprising:
            comparing a metadata record count to an event record count; and
            responsive to determining that the metadata record count is greater than the event record count, continuing comparing the event record count to the metadata count record until the metadata record count is equal to the event record count,
        wherein the matching further comprises:
            determining, by the processing device, that a metadata record matches an event record when the event record has a metadata indicator assigned thereto and when the metadata record and the event record have timestamps that are the same.

5. The system of claim 4, wherein the matching comprises:
    determining, by the processing device, that an event record has a metadata indicator assigned thereto; and
    comparing, by the processing device, the timestamp of the metadata records to the timestamp of the event record that has the metadata indicator assigned thereto.

6. The system of claim 4, wherein the method further comprises determining, by the processing device, that a metadata record matches an event record when the metadata record count matches the event record count.

7. A computer program product comprising:
    a computer readable storage medium having program instructions embodied therewith, the program instructions executable by a processing device to cause the processing device to perform a method for matching metadata records to event records, the method comprising:
        generating, by the processing device, a metadata record for each event record of a subset of a plurality of event records, the metadata record being one of a plurality of metadata records, wherein each of the subset of the plurality of event records is associated with a corresponding event that crosses a time boundary, while metadata records are not generated for event records other than the subset of the plurality of event records;
        storing, by the processing device, the event records in a first block and the metadata records at an end of the first block;
        assigning, by the processing device, a metadata indicator to each event record of the subset of the plurality of event records to indicate that the event record is associated with a metadata record;
        assigning, by the processing device, for each event record of the subset of the plurality of event records and the metadata record associated therewith, a timestamp;
        matching, by the processing device, for each event record of the subset of the plurality of event records, one of the plurality of metadata records with the event record based at least in part on the metadata indicator and the timestamp; and verifying the matching by performing a count matching technique comprising:
  comparing a metadata record count to an event record count; and
  responsive to determining that the metadata record count is greater than the event record count, continuing comparing the event record count to the metadata count record until the metadata record count is equal to the event record count,
wherein the matching further comprises:
  determining, by the processing device, that a metadata record matches an event record when the event record has a metadata indicator assigned thereto and when the metadata record and the event record have timestamps that are the same.

8. The computer program product of claim 7, wherein the matching comprises:
determining, by the processing device, that an event record has a metadata indicator assigned thereto; and
comparing, by the processing device, the timestamp of the metadata records to the timestamp of the event record that has the metadata indicator assigned thereto.

* * * * *